United States Patent
Tsaur et al.

(10) Patent No.: US 9,258,671 B2
(45) Date of Patent: Feb. 9, 2016

(54) HOST CONTROLLER INTERFACE AND MESSAGING METHOD FOR ANT APPLICATIONS

(71) Applicant: Broadcom Corporation, Irvine, CA (US)

(72) Inventors: Lih-Feng Tsaur, San Diego, CA (US);
Shawn Ding, San Diego, CA (US);
Shanshan Jiang, San Diego, CA (US);
Hsiao-Kai Wang, San Diego, CA (US);
Daochun Liu, San Diego, CA (US);
Guoxin Xie, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 34 days.

(21) Appl. No.: 14/310,938

(22) Filed: Jun. 20, 2014

(65) Prior Publication Data

US 2014/0378064 A1    Dec. 25, 2014

Related U.S. Application Data

(60) Provisional application No. 61/838,092, filed on Jun. 21, 2013.

(51) Int. Cl.
*H04B 7/00*    (2006.01)
*H04W 4/00*    (2009.01)
*H04W 84/18*    (2009.01)
*H04B 1/68*    (2006.01)

(52) U.S. Cl.
CPC ............. *H04W 4/008* (2013.01); *H04W 84/18* (2013.01)

(58) Field of Classification Search
CPC ... H04W 84/18; H04W 88/06; H04M 1/7253; H04B 1/406
USPC ............... 455/41.2–41.3, 127.4, 552.1, 553.1
See application file for complete search history.

(56) References Cited

U.S. PATENT DOCUMENTS

| | | | |
|---|---|---|---|
| 2014/0233444 A1* | 8/2014 | Wang | H04W 72/1242 370/311 |
| 2015/0248640 A1* | 9/2015 | Srinivasan | G06Q 10/08355 705/338 |

OTHER PUBLICATIONS

Ron Callahan, Wahoo's RPM Cadence Sensor Now Dual-Band, Jun. 23, 2014, only one page.*

* cited by examiner

*Primary Examiner* — Lee Nguyen
(74) *Attorney, Agent, or Firm* — Sterne, Kessler, Goldstein & Fox P.L.L.C.

(57) ABSTRACT

A system and method using ANT and/or ANT+ protocols for one or more ANT and/or ANT+ applications. The system can include a Bluetooth interface and a Host Controller Interface (HCI) that are configured to process incoming and outgoing ANT and/or ANT+ messages from/to one or more ANT and/or ANT+ enabled devices. The ANT and/or ANT+ messages can be communicated to one or more ANT and/or ANT+ enabled devices utilizing a Bluetooth transceiver. The Bluetooth interface and the HCI can be configured to wrap one or more ANT and/or ANT+ messages with a header and/or to remove a header from one or more wrapped ANT and/or ANT+ messages. The header can be an HCI compatible header.

20 Claims, 6 Drawing Sheets

HOST CONTROLLER INTERFACE AND MESSAGING METHOD FOR ANT APPLICATIONS

CROSS REFERENCE TO RELATED APPLICATIONS

This patent application claims the benefit of U.S. Provisional Patent Application No. 61/838,092, filed Jun. 21, 2013, entitled "A Host Controller Interface Message Method For ANT Applications," which is incorporated herein by reference in its entirety.

BACKGROUND

1. Field

This application relates generally to wireless communications, including wireless communications utilizing ANT and/or ANT+ protocols.

2. Related Art

The Bluetooth (IEEE 802.15.1 and Bluetooth Special Interest Group (SIG)) specification defines the Bluetooth communication protocol for radio frequency (RF) communications between two more communication devices utilizing a short-range radio link. Bluetooth operates in a globally unlicensed 2.4 GHz Industrial, Scientific, and Medical (ISM) band. Due to low power requirements, Bluetooth integrated circuits (ICs) are designed to consume very low power to operate.

Similar to the Bluetooth protocol, the ANT communication protocol represents an ultra-low-power, short range wireless technology operating on the 2.4 GHz ISM band. The ANT communication protocol can be used to establish a sensor network having one or more sensors that wirelessly communicate with one or more communication devices. For example, the ANT communication protocol can be that used in sports and fitness fields to implement personal area networks (PANs) for performance and health monitoring. ANT+ is an interoperability function that can be added to the base ANT communication protocol to allow for one or more ANT+ enabled devices to interface with one or more other ANT+ enabled devices.

BRIEF DESCRIPTION OF THE DRAWINGS

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

As will be apparent to one of ordinary skill in the relevant art(s) based on the teachings herein, exemplary embodiments can utilize one or more cellular communication standards, including (but not limited to) Long-Term Evolution (LTE), Evolved High-Speed Packet Access (HSPA+), Wideband Code Division Multiple Access (W-CDMA), CDMA2000, Time Division-Synchronous Code Division Multiple Access (TD-SCDMA), Global System for Mobile Communications (GSM), General Packet Radio Service (GPRS), Enhanced Data Rates for GSM Evolution (EDGE), and Worldwide Interoperability for Microwave Access (WiMAX) (IEEE 802.16) to provide some examples. Further, exemplary embodiments are not limited to cellular communication networks and can be used or implemented in other kinds of wireless communication access networks, including (but not limited to) Wireless Local Area Network(s) (WLAN) (IEEE 802.11), Bluetooth (IEEE 802.15.1 and Bluetooth Special Interest Group (SIG)), ANT, ANT+, Near-field Communication (NFC) (ISO/IEC 18092), ZigBee (IEEE 802.15.4), Radio-frequency identification (RFID), and/or infrared communication, to provide some examples. Each of these various standards and/or protocols is incorporated herein by reference in its entirety.

For the purposes of this discussion, the term "processor circuitry" shall be understood to be one or more: circuit(s), processor(s), or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to embodiments described herein. Alternatively, the processor can access an internal and/or external memory to retrieve instructions stored in the memory, which when executed by the processor, perform the corresponding function(s) associated with the processor.

Figure 1:
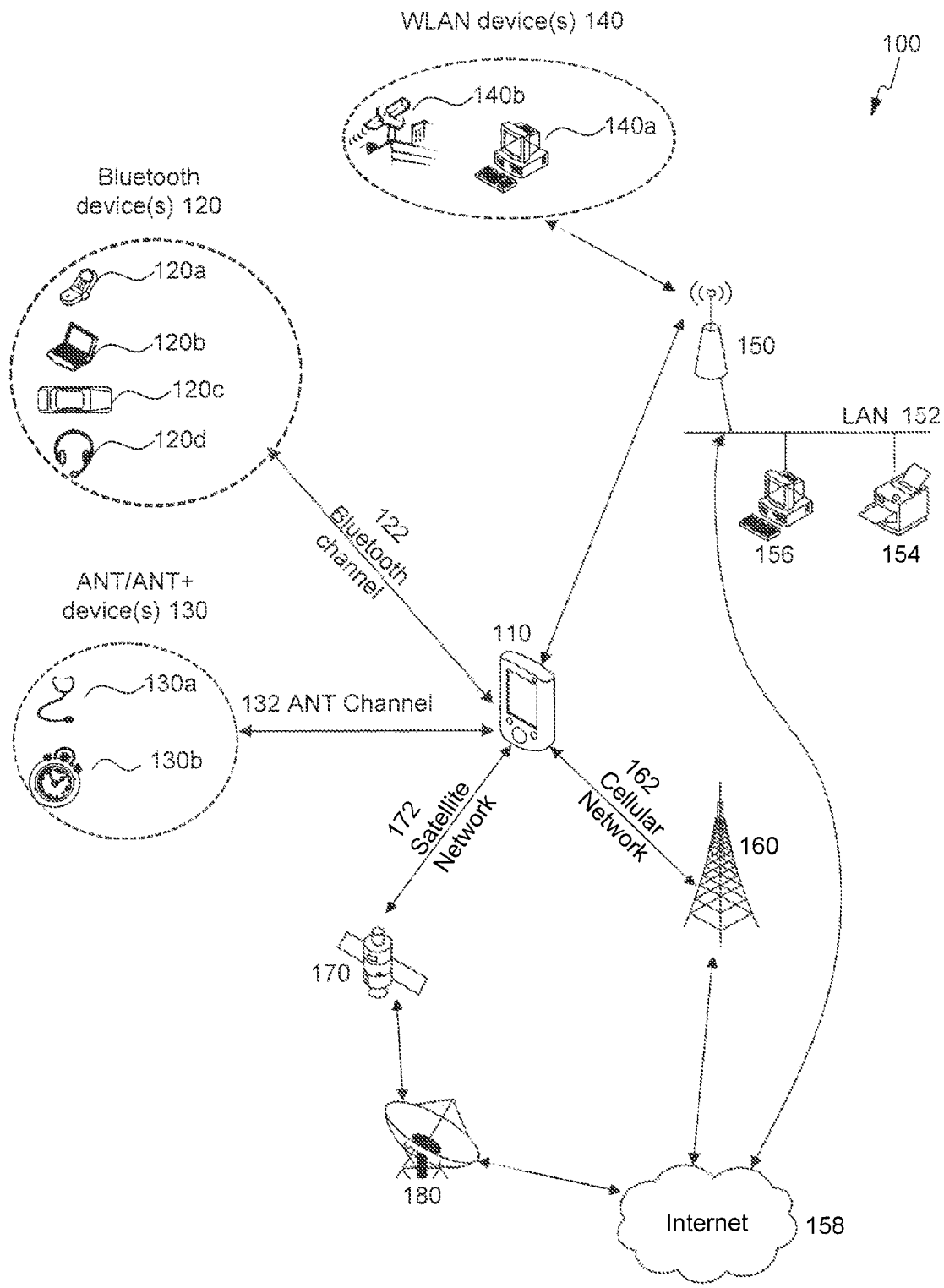
FIG. 1 illustrates an example network environment.

FIG. 1 illustrates an example communication environment 100 that can be utilized in one or more of the exemplary embodiments described herein. The communication environment 100 can include one or more mobile devices 110 that can be configured to communicate with, for example: one or more base stations 160 via one or more cellular communication networks 162; one or more access points (AP) 150 via one or more wireless local area networks (WLANs) 158; one or more satellites 170 via one or more satellite networks, including, for example, one or more Global Navigation Satellite Systems (GNSS); one or more Bluetooth devices 120 via one or more Bluetooth channels 122; one or more ANT and/or ANT+ devices 130 via one or more ANT channels 132; and/or one or more other well-known communication devices via one or more other well-known communication protocols as would be understood by those skilled in the relevant arts without departing from the spirit and scope of the present disclosure.

Examples of the mobile device 110 include (but are not limited to) a mobile computing device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses. In some embodiments, the mobile device 110 may be a stationary device, including, for example, a stationary computing device—such as a personal computer (PC), a desktop computer, a computerized kiosk, and an automotive/aeronautical/maritime in-dash computer terminal.

The one or more Bluetooth devices 120 can include (but are not limited to), for example, one or more mobile phones 120a, one or more computers 120b, one or more automobiles 120c, one or more headsets 120d, and/or one or more of the examples of the mobile device 110 discussed herein.

The mobile device 110 can be configured to communicate with one or more WLAN devices 140 via the AP(s) 150. The one or more WLAN devices 140 can include (but are not limited to), for example, one or more computers 140a, one or more home monitoring systems 140b (e.g., security cameras, thermostats, fire and/or carbon monoxide detectors, light fixtures, electrical fixtures and/or outlets, appliances, etc.), and/or one or more of the examples of the mobile device 110 discussed herein. The AP(s) 150 may be connected to one or more other AP(s), and/or one or more other devices through one or more Local Area Networks (LANs) and/or other WLANs. For example, Access Point 150 may be connected to one or more imaging devices 154 (e.g., printer, scanner, multi-function imaging devices, etc.), one or more computers 156, and/or one or more of the examples of the mobile device 110 discussed herein. The mobile device 110 can also be configured to be communicatively coupled to the internet 158 via the AP(s) 150.

The one or more ANT and/or ANT+ devices 130 can include (but are not limited to), for example, one or more health monitoring devices 130a—such as heart rate sensors, foot speed sensors, temperature sensors, blood glucose sensors, blood pressure sensors, etc., one or more an athletic devices 130b—such as bicycle/treadmill speed and/or cadence sensors, weight sensors, one or more mobile display devices—such as computerized wrist watches or "smart" watches, computerized eyeglasses, GNSS devices, and/or one or more of the examples of the mobile device 110 discussed herein.

The mobile device 110 can also be communicatively coupled to the internet 158 via the base station(s) 160, satellite(s) 170 in conjunction with one or more GNNS ground stations 180, the AP(s) 150, the Bluetooth device(s) 120, ANT and/or ANT+ device(s) 130, or any combination thereof.

Figure 2:
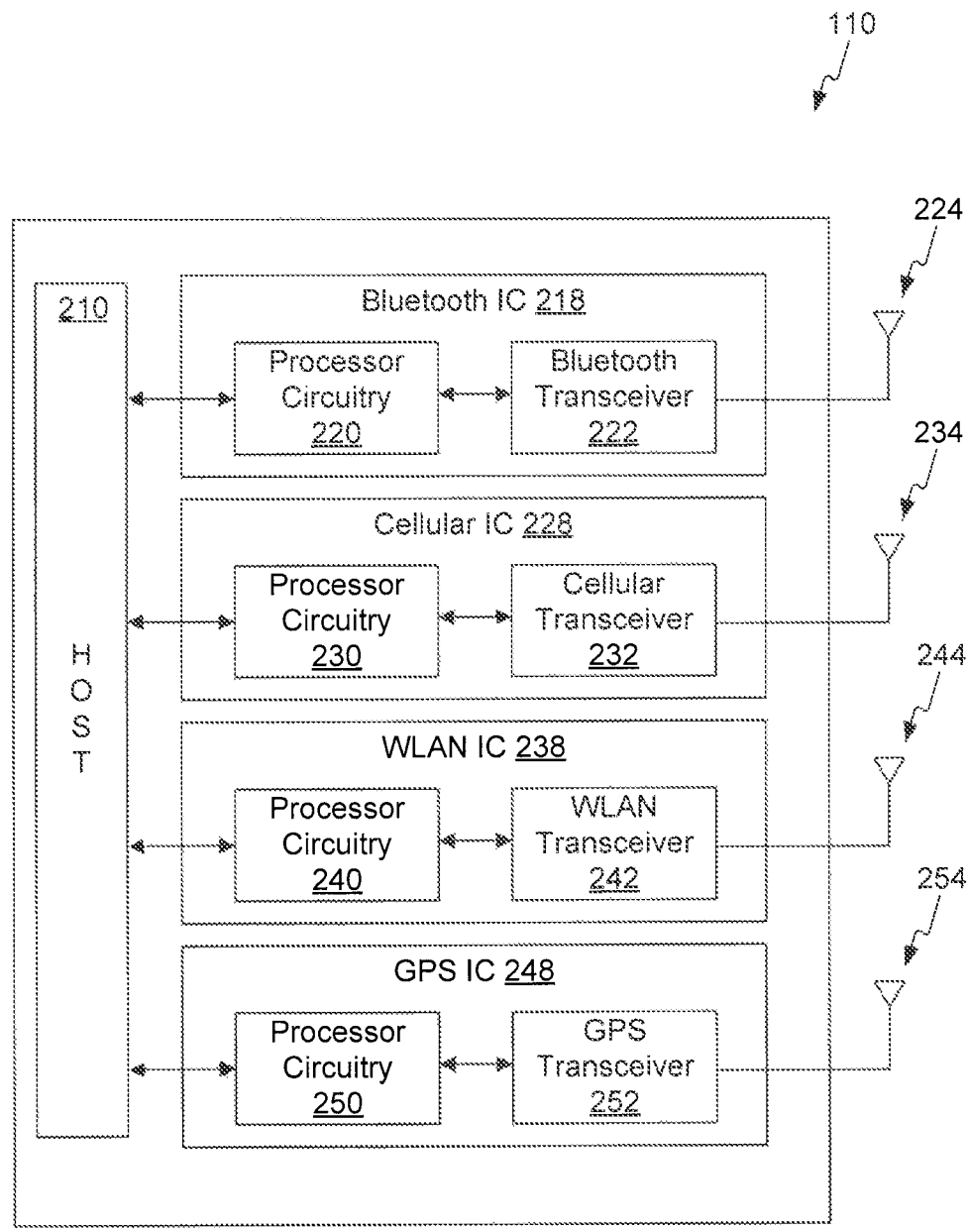
FIG. 2 illustrates a mobile device according to an exemplary embodiment of the present disclosure.

FIG. 2 illustrates the mobile device 110 according to an exemplary embodiment of the present disclosure. The mobile device 110 can include host 210 communicatively coupled to one or more integrated circuits (IC) configured for communications via one or more communication protocols. In an exemplary embodiment, the mobile device 110 includes a Bluetooth IC 218 configured for communications conforming to the Bluetooth protocol, a cellular IC 228 configured for communications conforming to one or more cellular protocols, a wireless local area network (WLAN) IC 238 configured for communications conforming to IEEE's 802.11 WLAN specification, and/or a Global Positioning System (GPS) IC 248 configured for communications conforming to one or more well-known navigational systems—such as the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples.

Those skilled in the relevant art(s) will understand that the mobile device 110 is not limited to these exemplary communications protocols, and the mobile device 110 can be configured for communications conforming to one or more other well-known communication protocols in addition to, or as an alternative to, the communication protocols discussed herein. That is, exemplary embodiments of the mobile device 110 can be configured for communications conforming to a subset or all of the communication protocols illustrated in FIG. 2, with or without the addition of one or more other well-known communication protocols.

In an exemplary embodiment, the Bluetooth IC 218 includes processor circuitry 220 communicatively coupled to a Bluetooth transceiver 222. The processor circuitry 220 can include one or more processors, circuitry, and/or logic that is configured to control the overall operation of the Bluetooth IC 218, including the operations of the Bluetooth transceiver 222, and/or to carry out instructions to perform arithmetical, logical, and/or input/output (I/O) operations of the Bluetooth IC 218.

The Bluetooth transceiver 222 can include one or more processors, circuitry, and/or logic that is configured to transmit and/or receive wireless communications conforming to the Bluetooth and/or ANT/ANT+ communication protocols.

The Bluetooth transceiver 222 can include a transmitter and a receiver that have one or more processors, circuitry, and/or logic configured to transmit and receive wireless communications, respectively, via antenna 224. Those skilled in the relevant art(s) will recognize that the Bluetooth transceiver 222 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 224 may include an integer array of antennas, and that the antenna 224 may be capable of both transmitting and receiving wireless communication signals. For example, the Bluetooth IC 218 can be configured for wireless communication utilizing a Multiple-input Multiple-output (MIMO) configuration.

In an exemplary embodiment, the cellular IC 228 includes processor circuitry 230 communicatively coupled to a cellular transceiver 232. The processor circuitry 230 can include one or more processors, circuitry, and/or logic that is configured to control the overall operation of the cellular IC 228, including the operations of the cellular transceiver 232, and/or to carry out instructions to perform arithmetical, logical, and/or input/output (I/O) operations of the cellular IC 228.

The cellular transceiver 232 can include one or more processors, circuitry, and/or logic that is configured to transmit and/or receive wireless communications conforming to one or more well-known cellular communication protocols-such as LTE, CDMA, and/or GSM to provide some examples. The cellular transceiver 232 can include a transmitter and a receiver that have one or more processors, circuitry, and/or logic configured to transmit and receive wireless communications, respectively, via antenna 234. Those skilled in the relevant art(s) will recognize that the cellular transceiver 232 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 234 may include an integer array of antennas, and that the antenna 234 may be capable of both transmitting and receiving wireless communication signals. For example, the cellular IC 228 can be configured for wireless communication utilizing a Multiple-input Multiple-output (MIMO) configuration.

In an exemplary embodiment, the wireless local area network (WLAN) IC 238 includes processor circuitry 240 communicatively coupled to a WLAN transceiver 242. The processor circuitry 240 can include one or more processors, circuitry, and/or logic that is configured to control the overall operation of the WLAN IC 238, including the operations of the WLAN transceiver 242, and/or to carry out instructions to perform arithmetical, logical, and/or input/output (I/O) operations of the WLAN IC 238.

The WLAN transceiver 242 can include one or more processors, circuitry, and/or logic that is configured to transmit and/or receive wireless communications conforming to one or more well-known wireless communication protocols—such as, for example, communications conforming to IEEE's 802.11 WLAN specification. The WLAN transceiver 242 can include a transmitter and a receiver that have one or more processors, circuitry, and/or logic configured to transmit and receive wireless communications, respectively, via antenna 244. Those skilled in the relevant art(s) will recognize that the WLAN transceiver 242 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 244 may include an integer array of antennas, and that the antenna 244 may be capable of both transmitting and receiving wireless communication signals. For example, WLAN IC 238 can be configured for wireless communication utilizing a Multiple-input Multiple-output (MIMO) configuration.

In an exemplary embodiment, the Global Positioning System (GPS) IC 248 includes processor circuitry 250 communicatively coupled to a GPS transceiver 252. The processor circuitry 250 can include one or more processors, circuitry, and/or logic that is configured to control the overall operation of the GPS IC 248, including the operations of the GPS transceiver 252, and/or to carry out instructions to perform arithmetical, logical, and/or input/output (I/O) operations of the GPS IC 248.

The GPS transceiver 252 can include one or more processors, circuitry, and/or logic that is configured to transmit and/or receive wireless communications conforming to one or more well-known navigational systems—such as the Global Navigation Satellite System (GNSS), the Russian Global Navigation Satellite System (GLONASS), the European Union Galileo positioning system (GALILEO), the Japanese Quasi-Zenith Satellite System (QZSS), the Chinese BeiDou navigation system, and/or the Indian Regional Navigational Satellite System (IRNSS) to provide some examples.

The GPS transceiver 252 can include a transmitter and a receiver that have one or more processors, circuitry, and/or logic configured to transmit and receive wireless communications, respectively, via antenna 254. Those skilled in the relevant art(s) will recognize that the GPS transceiver 252 can also include (but is not limited to) a digital signal processor (DSP), modulator and/or demodulator, a digital-to-analog converter (DAC) and/or an analog-to-digital converter (ADC), and/or a frequency converter (including mixers, local oscillators, and filters) to provide some examples. Further, those skilled in the relevant art(s) will recognize that the antenna 254 may include an integer array of antennas, and that the antenna 254 may be capable of both transmitting and receiving wireless communication signals.

Those skilled in the relevant art(s) will understand that the mobile device 110 is not limited to these exemplary communication ICs and respective communications protocols, and the mobile device 110 can be configured for communications conforming to one or more other well-known communication protocols in addition to, or as an alternative to, the communication ICs and/or communication protocols discussed herein.

Further, the mobile device 110 can include one or more positional and/or movement sensors—such as one or more accelerometers and/or one or more gyroscope sensors, implemented in (and/or in communication with) the mobile device 110. In exemplary embodiments, the location and/or movement of the mobile device 110 can be determined using one or more ICs configured for navigation purposes (e.g., GPS IC 248), one or more of the positional and/or movement sensors, and/or one or more positional determinations using signal characteristics relative to one or more base stations and/or access points.

Figure 3:
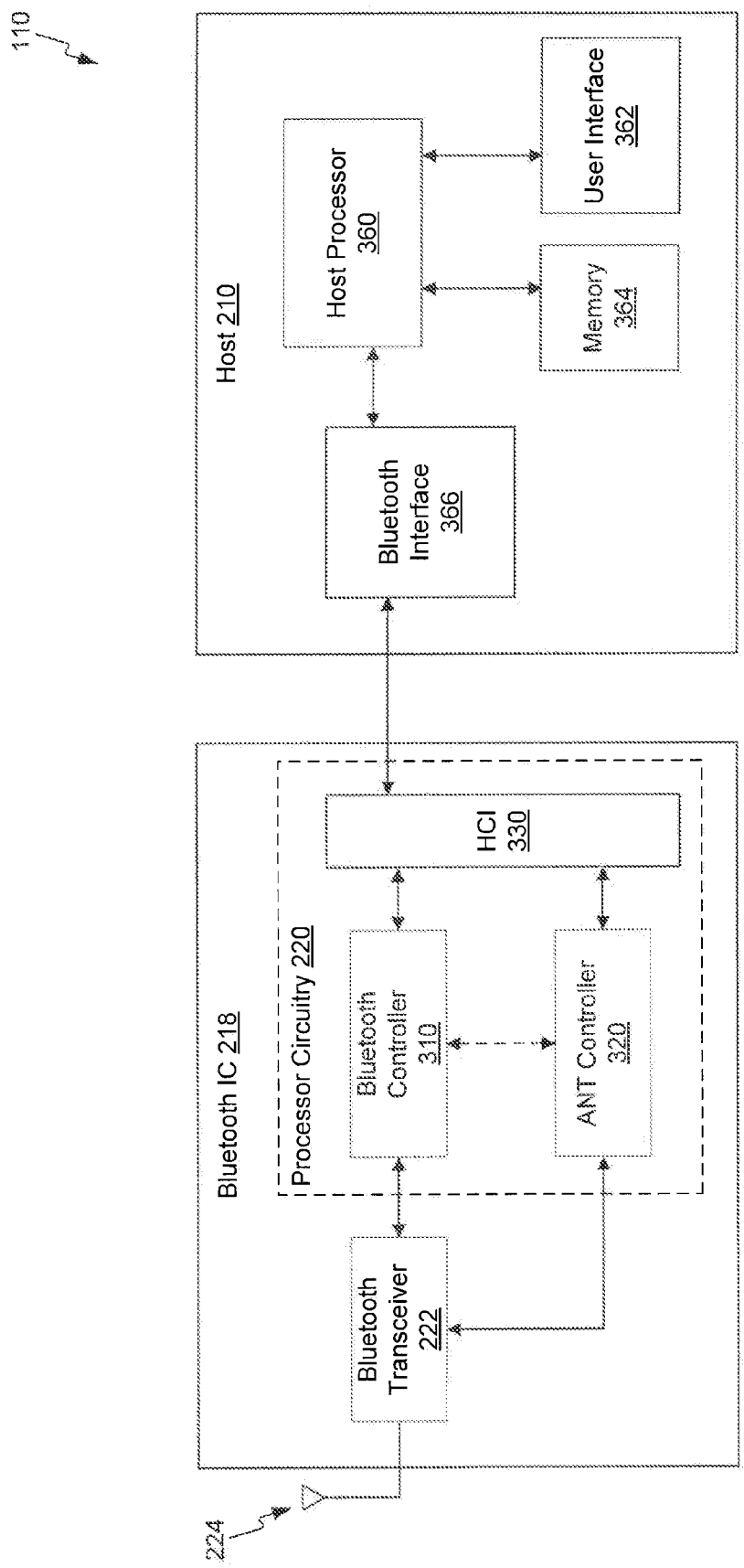
FIG. 3 illustrates a mobile device according to an exemplary embodiment of the present disclosure.

FIG. 3 illustrates the mobile device 110 according to an exemplary embodiment of the present disclosure. The mobile device 110 can include host 210 communicatively coupled to Bluetooth IC 218 configured for communications conforming to the Bluetooth and/or ANT/ANT+ communication protocols. For brevity, only the Bluetooth IC 218 is illustrated and discussed. However, as would be understood by those skilled in the relevant arts, the mobile device 110 can include one or more other communication ICs configured for communications conforming to one or more well-known communication protocols as illustrated in FIG. 2.

In an exemplary embodiment, the host 210 can include one or more processors, circuitry, and/or logic that is configured to control the overall operation of the mobile device 110, including the operation of the Bluetooth IC 218, the cellular IC 228, the WLAN IC 238, and/or the GPS IC 248. The one or more processors can include one or more baseband processors, one or more application processors, and/or one or more other processors (CPUs). As would be understood by those skilled in the relevant arts, any combination of the baseband processor(s), application processor(s) and/or other processor(s) may be embodied as a single chip and/or die.

The host 210 can include a host processor 360 communicatively coupled to user interface 362, memory 364, and Bluetooth interface (BI) 366. In exemplary embodiments, the host processor 360 can be configured to read and/or write data and/or instructions to/from the memory 364, carrying out one or more instructions to perform one or more defined functions, transmit and/or receive data from one or more of the communication ICs (e.g., Bluetooth IC 218), and/or process and/or analyze data received from one or more of the communication ICs and/or read from memory 364. For example, the host processor 360 can be configured to perform one or more system and/or user applications, including, for example, establishing/terminating communications via one or more of the communication ICs (e.g., Bluetooth IC 218), processing and/or providing data to a user via the user interface 362, and/or receiving and processing data received via the user interface 362. In an exemplary embodiment, the host processor 360 can be configured to generate one or more ANT and/or ANT+ commands, and to provide the generated ANT/ANT+ command(s) to the Bluetooth interface (BI) 366 for transmission to the Bluetooth IC 218. For the purposes of this discussion, information received by the host 210 from the Bluetooth IC 218 can be referred to as events, including, for example, one or more ANT/ANT+ events, and information generated by the host 210 and provided to the Bluetooth IC 218 can be referred to as commands, including, for example, one or more ANT/ANT+ commands.

The Bluetooth interface (BI) 366 can include one or more processors, circuitry, and/or logic that is configured to interface with the Bluetooth IC 218, receive one or more ANT and/or ANT+ commands from the host processor 360, convert the ANT and/or ANT+ command(s) to one or more HCI compatible formats, and send the converted ANT and/or ANT+ command(s) to the Bluetooth IC 218. For example, the BI 366 can be configured to add a header on to an ANT and/or ANT+ command received from the host processor 360. For the purposes of this discussion, the process of adding a header on to an ANT/ANT+ command can be referred to as "wrapping" the corresponding ANT/ANT+ command. In an exemplary embodiment, the header can be an HCI compatible header. Further, wrapped ANT and/or ANT+ commands can be referred to as "ANT HCI commands."

For event processing, the BI 366 can be configured to interface with the Bluetooth IC 218 and receive one or more ANT and/or ANT+ events from the Bluetooth IC 218. In an exemplary embodiment, the received ANT and/or ANT+ events can include a header, and the BI 366 can be configured to convert the ANT and/or ANT+ event(s) to one or more compatible formats. ANT and/or ANT+ events having a header (i.e., wrapped ANT and/or ANT+ events) can be referred to as "ANT HCI events. The BI 366 can be configured to remove a header from a wrapped ANT and/or ANT+ event received from the Bluetooth IC 218. For the purposes of this discussion, the process of removing a header from an ANT/ANT+ event can be referred to as "unwrapping" the corresponding ANT/ANT+ event.

The memory 364 stores data and/or instructions, where when the instructions are executed by the host processor 360, can be used to perform the functions described herein. The memory 364 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM).

The user interface 362 can include one or more input and/or output devices, including (but not limited to), for example, one or more imaging devices—such as one or more displays, monitors, video projectors, and/or printers; one or more input devices—such as one or more keyboards, keypads, trackpads, mice, electronic writing devices, and/or electronic smart boards; and/or one or more audio and/or visual devices—such as one or more speakers, microphones, cameras, and/or video-recording devices.

As discussed with reference to FIG. 2, the Bluetooth IC 218 can include processor circuitry 220 communicatively coupled to a Bluetooth transceiver 222. The processor circuitry 220 can include one or more processors, circuitry, and/or logic that is configured to control the overall operation of the Bluetooth IC 218, including the operations of the Bluetooth transceiver 222, and/or to carry out instructions to perform arithmetical, logical, and/or input/output (I/O) operations of the Bluetooth IC 218.

In an exemplary embodiment, and with reference to FIG. 3, the processor circuitry 220 can include a Host Controller Interface (HCI) 330 communicatively coupled to a Bluetooth controller 310 and an ANT controller 320. In an exemplary embodiment, the Bluetooth transceiver 222 is communicatively coupled to the Bluetooth controller 310 and the ANT controller 320. Alternatively, the Bluetooth transceiver 222 can be communicatively coupled to the Bluetooth controller 310, which is communicatively coupled to the ANT controller 320, or vice versa. That is, the Bluetooth transceiver 220 can be communicatively coupled to the ANT controller 320 via the Bluetooth controller 310, or to the Bluetooth controller 310 via the ANT controller 320.

In an exemplary embodiment, the Host Controller Interface (HCI) 330 can include one or more processors, circuitry, and/or logic that is configured to interface with the host 210 (e.g., BI 366) to receive outgoing data (e.g., ANT HCI commands) from the host 210, process the outgoing data (e.g., unwrap the ANT HCI commands), and provide the processed data to the Bluetooth controller 310 and/or the ANT controller 320. The HCI 330 can be configured to receive incoming data from the Bluetooth controller 310 and/or the ANT controller 320, process the incoming data (e.g., wrap the ANT HCI events), and provide the processed data (e.g., ANT and/or ANT+ events) to the host 210. In operation, information sent from the host 210 to the Bluetooth IC 218 can be referred to as commands, including, for example, one or more ANT/ANT+ commands. Information received by the host 210 from the Bluetooth IC 218 can be referred to as events, including, for example, one or more ANT/ANT+ events.

In an exemplary embodiment, the host 120 is interfaced with the Bluetooth IC 218 (e.g., the HCI 330) via one or more well-known interfaces, such as a universal asynchronous receiver/transmitter (UART), RS-232 serial port, slim bus, Universal Serial Bus (USB), and/or any other well-known interface protocols as would be understood by one of ordinary skill in the relevant arts.

In an exemplary embodiment, the HCI 330 can be configured to process one or more commands and provide the processed command(s) to the Bluetooth controller 310 and/or the ANT controller 320, and/or to process one or more events received from the Bluetooth controller 310 and/or the ANT controller 320 and provide the processed events to the host 210. In operation, the HCI 330 can be configured to process one or more ANT, ANT+, and/or Bluetooth commands (e.g., unwrap an ANT HCI command) and provide the processed command(s) to the Bluetooth controller 310 and/or ANT controller 320 for subsequent transmission to one or more ANT/ANT+ and/or Bluetooth enabled devices via the Bluetooth transceiver 222. For example, the HCI 330 can be configured to process one or more ANT/ANT+ commands (e.g., unwrap an ANT HCI command) and provide the processed ANT/ANT+ command(s) to the ANT controller 320 for subsequent transmission to one or more ANT/ANT+ enabled devices via the Bluetooth transceiver 222. As such, the Bluetooth transceiver 222 can be support both Bluetooth communications and ANT, ANT+ communications because ANT uses the same physical layer resources (frequencies modulation, etc.) as that of Bluetooth.

In operation, the host 210 can be configured to generate and send ANT, ANT+, and/or Bluetooth commands via the Bluetooth IC 218. In an exemplary embodiment, the HCI 330 can be configured to receive one or more ANT and/or ANT+ commands from the host 210, and to convert the ANT and/or ANT+ commands to one or more HCI compatible formats. For example, the HCI 330 can be configured to receive a wrapped ANT command (e.g., ANT HCI command) from the host 210 and remove a header from the wrapped ANT command. Similarly, the HCI 300 can be configured to add a header on to an ANT event received from one or more ANT enabled devices 130 and to provide the wrapped ANT event (e.g., ANT HCI event) to the host 210. For the purposes of this discussion, the process of removing a header from an ANT command can be referred to as "unwrapping" the corresponding ANT command. The process of adding a header on to an ANT event can be referred to as "wrapping" the corresponding ANT event. In an exemplary embodiment, the header can be an HCI compatible header. Again, wrapped ANT commands and wrapped ANT events can be referred to as "ANT HCI commands" and "ANT HCI events," respectively.

For event processing, the HCI 330 process one or more events (e.g., wrap the events) received from the Bluetooth controller 310 and/or the ANT controller 320 and provide the processed events to the host 210. In operation, the HCI 330 can be configured to process one or more ANT, ANT+, and/or Bluetooth events received from the Bluetooth controller 310 and/or ANT controller 320 and provide the processed events(s) to host 210. For example, the HCI 330 can be configured to wrap one or more ANT/ANT+ events and provide the wrapped ANT/ANT+ event(s) to the host 210 for subsequent processing.

In an exemplary embodiment, the HCI 330 can be configured to receive one or more ANT and/or ANT+ events from one or more ANT and/or ANT+ enabled devices via the Bluetooth transceiver 222, and to convert (e.g., wrap) the ANT and/or ANT+ events to one or more HCI compatible formats (e.g., ANT HCI events). For example, the HCI 330 can be configured to add an HCI-compatible header on to an ANT event received from an ANT and/or ANT+ enabled device to generate an ANT HCI event.

In an exemplary embodiment, the Bluetooth controller 310 can include one or more processors, circuitry, and/or logic that is configured to process one or more Bluetooth commands received from the host 210 via the HCI 330 and/or process one or more Bluetooth events received from one or more Bluetooth enabled devices 120 via the Bluetooth transceiver 222. In an exemplary embodiment, the Bluetooth controller 310 can include one or more Bluetooth libraries. The one or more Bluetooth libraries can include (but are not limited to), for example, data, code and/or one or more Bluetooth functions utilized by the Bluetooth controller 310 to: manage one or more Bluetooth radios (e.g., Bluetooth transceiver 222), discover one or more Bluetooth enabled devices 120 within the communication environment 100, determine one or more services of one or more discovered devices, convert data and/or instructions from, or to be sent to, one or more discovered devices.

In an exemplary embodiment, the ANT controller 320 can include one or more processors, circuitry, and/or logic that is configured to process one or more ANT and/or ANT+ commands received from the host 210 via the HCI 330 and/or process one or more ANT and/or ANT+ events received from one or more ANT and/or ANT+ enabled devices 130 via the Bluetooth transceiver 222. In an exemplary embodiment, the ANT controller 320 can include one or more ANT and/or ANT+ libraries. The one or more ANT and/or ANT+ libraries can include (but are not limited to), for example, data, code and/or one or more ANT and/or ANT+ functions utilized by the ANT controller 320 to: manage one or more Bluetooth radios (e.g., Bluetooth transceiver 222), discover one or more ANT and/or ANT+ enabled devices 130 within the communication environment 100, determine one or more services of one or more discovered devices, convert data and/or instructions from, or to be sent to, one or more discovered devices.

In exemplary embodiments, the ANT controller 320 can be configured to queue the wrapped ANT commands received from the HCI 330 for subsequent processing by the ANT controller 320. The ANT controller 320 can be configured to store the queued commands for subsequent processing, and to transmit the processed ANT commands to one or more ANT enabled devices 130 via the Bluetooth transceiver 222.

Figure 5:
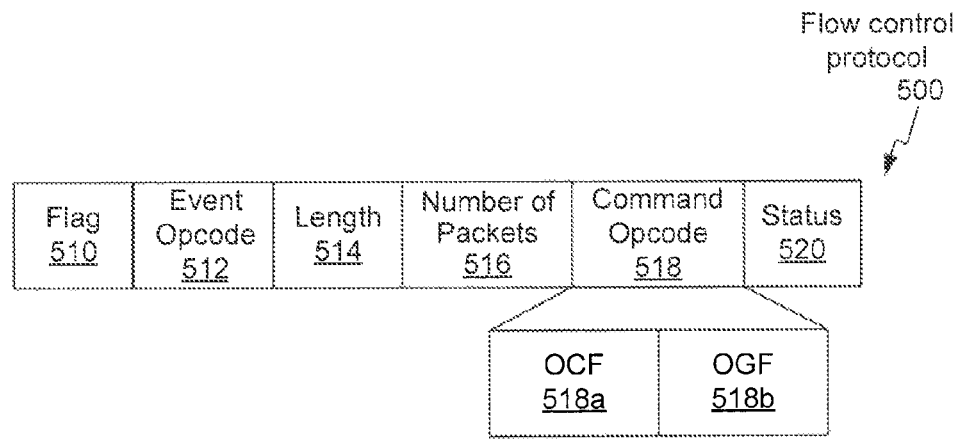
FIG. 5 illustrates a protocol for ANT flow control according to an exemplary embodiment of the present disclosure.

The ANT controller 320 can be configured to generate and provide an acknowledgement message to the HCI 330 to indicate that the ANT command has been successfully received and queued by the ANT controller 320. The ANT controller 320 can also be configured to generate and provide the HCI 330 with a non-acknowledgement message to indicate that the ANT command has not been queued by the ANT controller 320 when the message cannot be queued for some reason (e.g., processor or bandwidth overload and/or conflict). In operation, the HCI 330 can be configured to wait a predetermined or random time delay, and resubmit the ANT command to the ANT controller 320 following the delay. In an exemplary embodiment, the ANT controller 320 can be configured to control the flow of ANT and/or ANT+ commands to one or more ANT enabled devices 130. For example, the ANT controller 320 can utilize one or more acknowledgment and/or non-acknowledgement message to control the flow of ANT and/or ANT+ commands. In an exemplary embodiment, the ANT controller 320 can be configured to generate acknowledgement and/or non-acknowledgement messages that conform to a flow control protocol 500 as illustrated in FIG. 5 and discussed in detail below. In exemplary embodiment, the HCI 330 can be configured to control the flow of ANT/ANT+ commands and/or events independent of acknowledgement message received from the ANT controller 320. That is, the HCI 330 can be configured to restrict the flow and/or queuing of ANT/ANT+ commands and/or events because of, for example, processor or bandwidth overload and/or conflict and/or any other reasons as would be understood by those skilled in the relevant arts.

Figure 4:
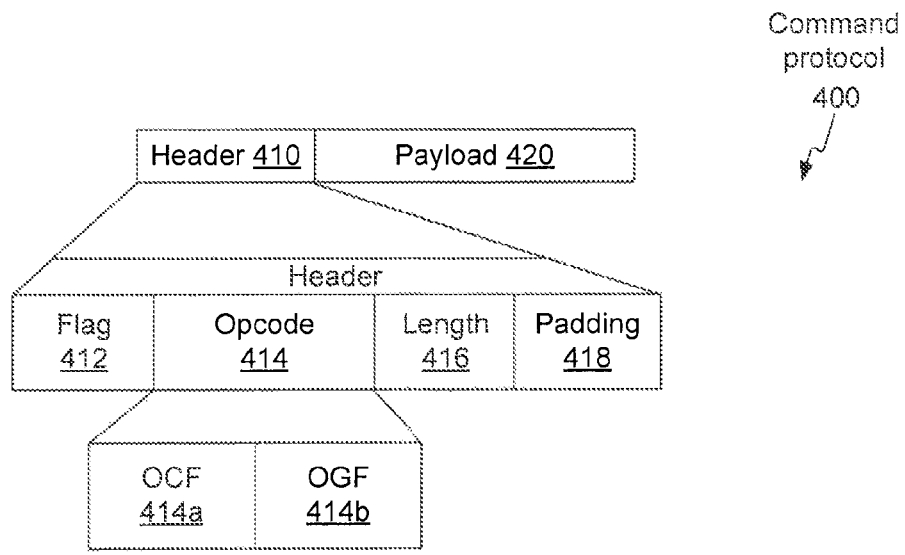
FIG. 4 illustrates a protocol for ANT commands according to an exemplary embodiment of the present disclosure.

FIG. 4 illustrates a command protocol 400 according to an exemplary embodiment of the present disclosure. In an exemplary embodiment, the HCI 330 is configured to process one or more ANT and/or ANT+ commands to conform to the command protocol 400.

For example, the HCI 330 can be configured to process (e.g., wrap) one or more ANT and/or, ANT+ commands and provide the processed command(s) to the ANT controller 320 for subsequent transmission to one or more ANT and/or ANT+ enabled devices 130 via the Bluetooth transceiver 222. In operation, the HCI 330 can be configured to receive one or more ANT and/or ANT+ commands from the host 210, and to convert the ANT and/or ANT+ command(s) to commands conforming to the command protocol 400 (e.g. ANT HCI commands). In an exemplary embodiment, the HCI 330 can be configured to wrap the one or more ANT and/or ANT+ commands received from the host 210 by adding an HCI compatible header on to the ANT and/or ANT+ command(s) to generate one or more ANT HCI commands.

In an exemplary embodiment, the command protocol 400 includes a header 410 and a payload 420. The payload 420 can include one or more ANT and/or ANT+ commands received from the host 210. The header 410 is added to the payload 420, and can be, for example, five bytes, and include flag 412, opcode 414, length 416, and padding 418. The flag 412 can be, for example, one byte of data. In an exemplary embodiment, the flag 412 can have a predefined value of, for example, 0x01, representing an HCI command. The opcode 414 can be, for example, two bytes of data that is divided into two fields: Opcode Command Field (OCF) 414a and Opcode Group Field (OGF) 414b. The OGF 414a can occupy, for example, six bits of opcode 414, while the OCF 414b can occupy, for example, the remaining ten bits of opcode 414. In an exemplary embodiment, OGF 414a can have a value of, for example, 0x3F, which represents a vendor-specific event. In an exemplary embodiment, the OGF 414b can have a value of, for example, 0xEC, which represents that the command is an ANT and/or ANT+ command. In operation, the OGF 414b can have any unused value not otherwise used by the command protocol 400. The length 416 can be, for example, one byte of data, and have a value that corresponds to the total length of ANT and/or ANT+ command included in the payload 420 plus one byte. The padding 418 can be, for example, one byte, and be configured as padding for the header 410. In an exemplary embodiment, the padding 418 has a value of, for example, 0xFF.

FIG. 5 illustrates a flow control protocol 500 for a flow control event message that is of a first type according to an exemplary embodiment of the present disclosure. In operation, the ANT controller 320 can utilize one or more acknowledgment and/or non-acknowledgement messages to control the flow of ANT and/or ANT+ commands to one or more ANT and/or ANT+ enabled devices 130. In an exemplary embodiment, the ANT controller 320 can be configured to generate acknowledgement and/or non-acknowledgement messages that conform to the flow control protocol 500 as illustrated in FIG. 5.

In an exemplary embodiment, the flow control protocol 500 can be, for example, seven bytes, and include flag 510, event opcode 512, length 514, number of packets 516, command opcode 518, and status 520. In an exemplary embodiment, the flag 510 can be, for example, one byte of data and can have a value of, for example, 0x04 to represent an HCI event. The event opcode 512 can be, for example, one byte of data and can have a value of, for example, 0x0E to represent that the flow control protocol 500 is a command complete event. The length 514 can be, for example, one byte of data and can have a value that corresponds to the total length of the flow protocol 500. The number of packets 516 can be, for example, one byte of data and can represent the number of HCI command packets that have been received by the ANT controller 310. Command opcode 518 can be, for example, two bytes of data that is divided into two fields: Opcode Command Field (OCF) 518a and Opcode Group Field (OGF) 518b. The OGF 518a can occupy, for example, six bits of command opcode 518, while the OCF 518b can occupy, for example, the remaining ten bits of command opcode 518. In an exemplary embodiment, OGF 518a can have a value of, for example, 0x3F, which represents that the event is a vendor-specific event that is in response to a vendor-specific command. In an exemplary embodiment, the OGF 518b can have a value of, for example, 0xEC, which represents that the event is an ANT and/or ANT+ event that is in response to an ANT and/or ANT+ command.

In operation, the OGF 518b can have any unused value not otherwise used by the flow control protocol 500. In an exemplary embodiment, the command opcode 518 can be a copy of the opcode 414 of the command protocol message 400 that causes the flow control event message conforming to the flow control protocol 500 to be generated. Status 520 can be, for example, one byte of data and can indicate whether one or more previously received command protocol messages 400 were successfully completed. In an exemplary embodiment, the status 520 can have a value of zero to represent a successfully completed command. The successfully completed command can represent that the ANT controller 320 has accepted the command protocol message 400 and has placed the command protocol message 400 into a command queue for processing. In exemplary embodiments where the queue is full, the ANT controller 320 can communicate as such to the HCI 330. The HCI 330 is configured to set the status 520 to a value of, for example, 0x1F to indicate to the host 210 the inability of the ANT controller 320 to queue the previously sent command protocol message 400, and therefore the host 210 should resend after a delay. Accordingly, the HCI 330 formulates the flow control event message conforming to the flow control protocol 500 to indicate that the protocol is vender specific (OCF 518a), and whether the message is related to an ANT command (OCF 518b), and provides a status identifier (status 520) that indicates the status of one or more prior commands from the host 210 so that the host 210 will know whether or not it needs to back off from future commands.

In an exemplary embodiment, the HCI 330 can be configured to forward the flow control event message conforming to the flow control protocol 500 to the host 210. The host 210 can be configured to process the flow control event message to determine whether the previously sent command was successful received and processed (e.g., queued) by the ANT controller 320. In response to a received flow control message indicating that the command has not been queued (e.g., status 520 has a value of, for example, 0x1F), the host 210 can be configured to wait a predetermined or random time delay before resubmitting the ANT command to the HCI 330. In an exemplary embodiment, in response to an unsuccessful queue, the host 210 can be configured to terminate the transmission of the ANT command instead of resubmitting after an elapsed time delay.

Figure 6:
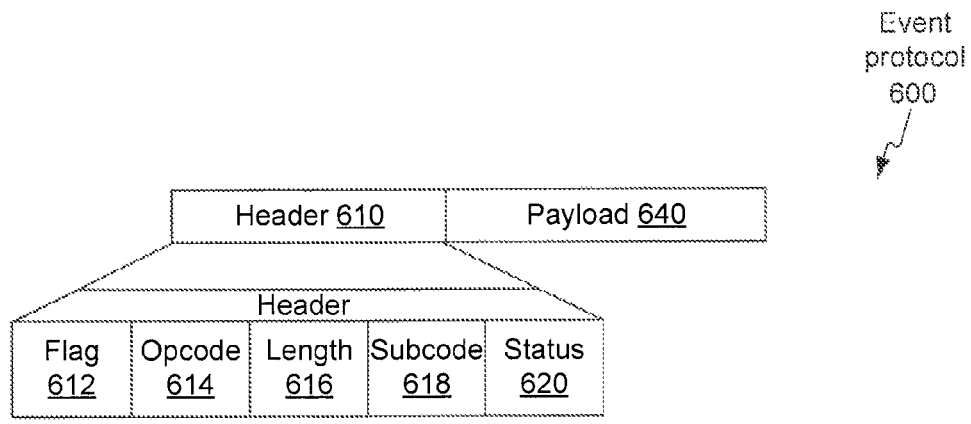
FIG. 6 illustrates a protocol for ANT events according to an exemplary embodiment of the present disclosure.

FIG. 6 illustrates an event protocol 600 for an event message that is of a second type according to an exemplary embodiment of the present disclosure. In an exemplary embodiment, the HCI 330 is configured to process one or more ANT and/or ANT+ events received from one or more ANT and/or ANT+ enabled devices 130 to conform to the event protocol 600. For example, the HCI 330 can be configured to process (e.g., wrap) one or more ANT and/or, ANT+ events and provide the processed event(s) to the host 210 for subsequent processing by the host 210. In an exemplary embodiment, the processing (e.g., wrapping) of the one or more ANT and/or, ANT+ events can include adding an HCI compatible header on to the ANT and/or ANT+ event(s). In an exemplary embodiment, the event protocol 600 is a vendor-specific format that is compatible with the host 210.

In operation, the HCI 330 can be configured to receive one or more ANT and/or ANT+ events from one or more ANT and/or ANT+ enabled devices 130 via the Bluetooth transceiver 222 and ANT controller 310. For example, the ANT controller 310 can be configured to receive the one or more ANT and/or ANT+ events from the Bluetooth transceiver 222, process the received ANT and/or ANT+ event(s), and forward the processed ANT and/or ANT+ event(s) to the HCI 330. In an exemplary embodiment, the one or more ANT and/or ANT+ events can be received by the Bluetooth controller 310 via the Bluetooth transceiver 222, and forwarded to ANT controller 310 from the Bluetooth controller 310 for subsequent processing. The ANT controller 310 can then provide the processed ANT and/or ANT+ event(s) to the HCI 330 for processing by the HCI 330 to conform to the event protocol 500.

In an exemplary embodiment, one or more ANT and/or ANT+ events can be generated by one or more ANT and/or ANT+ enabled devices 130 in response to one or more ANT and/or ANT+ commands received by the ANT and/or ANT+ enabled device(s) 130. In an alternative embodiment, the one or more ANT and/or ANT+ events can be generated by one or more ANT and/or ANT+ enabled devices 130 independent of command(s) received by the ANT and/or ANT+ enabled device(s) 130. That is, the ANT and/or ANT+ enabled device(s) 130 can be configured to generate and/or provide the one or more ANT and/or ANT+ events at, for example, a predetermined time, periodically, and/or in response to processing by the ANT and/or ANT+ enabled device(s) 130.

In an exemplary embodiment, the event protocol 600 can include a header 610 and a payload 640. The payload 640 can include one or more ANT and/or ANT+ events received from one or more ANT and/or ANT+ enabled devices 130. For example, the payload 640 can include data measured by a wearable ANT enable device, such as a heart rate monitor, speed sensor, and/or blood pressure monitor to provide some examples. The header 610 can be for example, five bytes and can include five data fields. For example, the header 610 can include flag 612, opcode 614, length 616, subcode 618, and status 620, where each field occupies one byte of the header 610.

The flag 612 can have a value of, for example, 0x04, which represents an HCI event. The opcode 614 can have a value of, for example, 0xFF, which is a vendor specific ANT and/or ANT+ event. The length 616 can have a value that, for example, corresponds to the total length of the ANT and/or ANT+ event included in the payload 540 plus two bytes. The subcode 618 can represent, for example, that the event is an ANT and/or ANT+ event and may be assigned any value not utilized in the other fields of the event protocol 600. In an exemplary embodiment, the subcode 618 can have a value of, for example, 0x2D, to indicate that the event is an ANT and/or ANT+ event. The status 620 can represent the status of the event message conforming to the event protocol 600. For example, the status 620 can indicate whether one or more previously received command protocol messages 400 has been successfully completed. For example, the status 620 can be used by the HCI 330 to acknowledge whether one or more previously received ANT and/or ANT+ commands has been successfully received and queued by the ANT controller 320. In this example, the event message was generated by one or more ANT and/or ANT+ enabled devices 130 in response to one or more previously received ANT and/or ANT+ commands. In an exemplary embodiment, when the ANT and/or ANT+ event is generated independent of a previously received ANT and/or ANT+ command, the status 620 can be used to indicate that subsequent command(s) will not be successfully queued by the ANT controller 320 and/or the HCI 330, and the host 210 is to delay one or more subsequent ANT and/or ANT+ commands. In operation, the ANT controller 320 can be configured to communicate information indicating successful and/or successful queuing to the HCI 330. The HCI can be configured to set the status 620 accordingly. The HCI 330 can also be configured to set the status based on one or conditions (e.g., processing overload, etc.) of the HCI 330.

In an exemplary embodiment, the status 620 can have, for example a value of zero to represent a successfully received and processed command, or that the HCI 330 and/or ANT controller 320 can successfully process one or more subsequent commands from the host 210. The status 620 can have a value, of for example, 0x1F to indicate to the HCI 330 and/or host 210 that the command was not successfully received and processed, or that the host 210 should delay one or more subsequent ANT and/or ANT+ commands as the command(s) will not be successfully processed as the ANT controller 320, HCI 330, and/or the ANT and/or ANT+ enabled device(s) 130 are overloaded.

Figure 7:
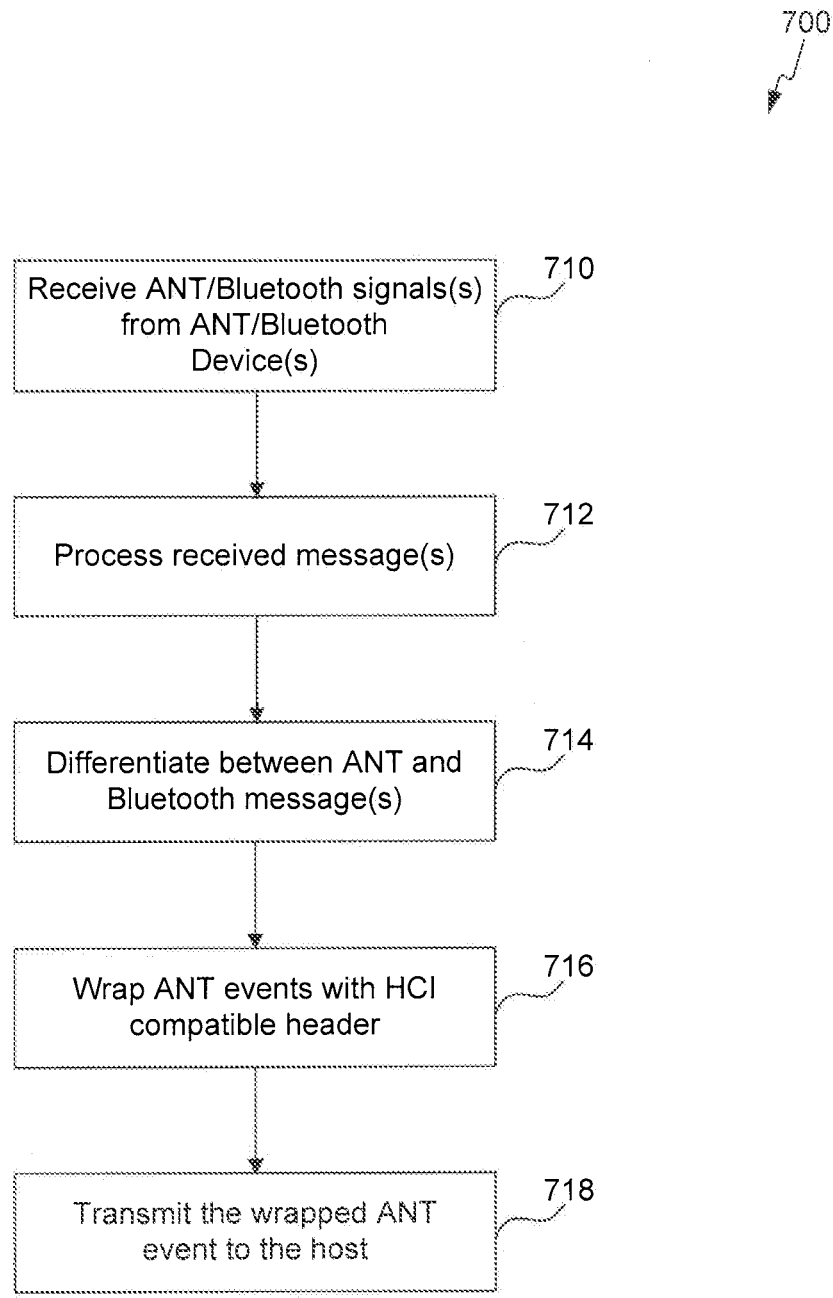
FIG. 7 illustrates a flowchart of an ANT event procedure according to an exemplary embodiment of the present disclosure.

FIG. 7 illustrates a flowchart 700 of an event processing method in accordance with an exemplary embodiment of the present disclosure. The method of flowchart 700 is described with continued reference to one or more of FIGS. 1-6. The steps of the method of flowchart 700 are not limited to the order described below, and the various steps may be performed in a different order. Further, two or more steps of the method of flowchart 700 may be performed simultaneously with each other.

The method of flowchart 700 begins at step 710, where the Bluetooth IC 218 receives one or more ANT/ANT+ and/or Bluetooth signals. In an exemplary embodiment, the Bluetooth transceiver 222 can receive one or more ANT/ANT+ and/or Bluetooth signals from one or more ANT/ANT+ enabled device 130 and/or one or more Bluetooth enabled devices 120. As discussed above, both Bluetooth and ANT signals use the same frequency spectrum and modulation so that a Bluetooth transceiver can also transmit and receive ANT/ANT+ signals.

After step 710, the method of flowchart 700 transitions to step 712, where the Bluetooth IC 218 can process the received ANT/ANT+ and/or Bluetooth signals. In an exemplary embodiment, the Bluetooth transceiver 222 can be configured to, for example, downconvert, demodulate, and perform any A/D conversion of the received signal(s) to generate received message(s) for further processing.

After step 712, the method of flowchart 700 transitions to step 714, where the Bluetooth IC 218 is configured to determine whether the received message(s) are one or more ANT and/or ANT+ messages from one or more ANT enabled devices 130 or one or more Bluetooth messages from one or more Bluetooth enabled devices 120.

In an exemplary embodiment, the Bluetooth transceiver 222 can be configured to provide the received ANT/ANT+ and/or Bluetooth messages to, for example, both the ANT controller 320 and the Bluetooth controller 310. In operation, the ANT controller 320 can be configured to determine if the received messages are ANT and/or ANT+ messages. If the ANT controller 320 determines that the received messages are ANT and/or ANT+ messages, the ANT controller 320 can be configured to process the messages before forwarding the processed ANT and/or ANT+ messages to the HCI 330 for subsequent processing by the HCI 330. If the ANT controller 320 determines that the received messages are Bluetooth messages, the ANT controller 320 can be configured to drop the Bluetooth messages. Similarly, the Bluetooth controller 310 can be configured to determine if the received messages are Bluetooth messages. If the Bluetooth controller 310 determines that the received messages are Bluetooth messages, the Bluetooth controller 310 can be configured to process the messages before forwarding the processed Bluetooth messages to the HCI 330 for subsequent processing by the HCI 330. If the Bluetooth controller 310 determines that the received messages are ANT and/or ANT+ messages, the Bluetooth controller 310 can be configured to drop the ANT and/or ANT+ messages.

In an exemplary embodiment, the Bluetooth transceiver 222 can be configured to provide the received ANT/ANT+ and/or Bluetooth messages to, for example, the Bluetooth controller 310. In operation, the Bluetooth controller 310 can configured to determine if the received messages are Bluetooth messages, or the messages are ANT/ANT+ messages. If the Bluetooth controller 310 determines that the received messages are Bluetooth messages, the Bluetooth controller 310 can be configured to process the messages before forwarding the processed Bluetooth messages to the HCI 330 for subsequent processing by the HCI 330. If the Bluetooth controller 310 determines that the received messages are ANT and/or ANT+ messages, the Bluetooth controller 310 can be configured to forward the ANT and/or ANT+ messages to the ANT controller 320 for subsequent processing by the ANT controller 320.

In an exemplary embodiment, the Bluetooth transceiver 222 can be configured to provide the received ANT/ANT+ and/or Bluetooth messages to, for example, the ANT controller 320. In operation, the ANT controller 320 can configured to determine if the received messages are Bluetooth messages, or the messages are ANT/ANT+ messages. For example, the determination can be made on whether the ANT controller 320 recognizes the message format. If the ANT controller 320 determines that the received messages are ANT and/or ANT+ messages, the ANT controller 320 can be configured to process the messages before forwarding the processed ANT and/or ANT+ messages to the HCI 330 for subsequent processing by the HCI 330. For example, ANT controller 320 can process the ANT and/or ANT+ messages and provide one or more ANT and/or ANT+ events to the HCI 330. If the ANT controller 320 determines that the received messages are Bluetooth messages, the ANT controller 320 can be configured to forward the Bluetooth messages to the Bluetooth controller 310 for subsequent processing by the Bluetooth controller 310.

After step 714, the method of flowchart 700 transitions to step 716, where HCI 330 is configured to receive the ANT and/or ANT+ events from the ANT controller 320 and to wrap the ANT and/or ANT+ events by adding an HCI compatible header on to the ANT and/or ANT+ events. In an exemplary embodiment, the HCI 330 is configured to add an HCI compatible header on to the one or more ANT and/or ANT+ events so that the ANT and/or ANT+ event(s) conform to, for example, the event protocol 600 illustrated in FIG. 6, and discussed above.

After step 716, the method of flowchart 700 transitions to step 718, where the Bluetooth IC 218 is configured to transmit the ANT and/or ANT+ event(s) having the HCI compatible header to the host 210. In an exemplary embodiment, the HCI 330 is configured to transmit the ANT and/or ANT+ event(s) having the HCI compatible header (e.g., ANT HCI event(s)) to the host 210. Upon receipt of the ANT and/or ANT+ event(s), the host 210 (e.g., BI 336) can be configured to unwrap the header from the ANT and/or ANT+ event(s).

Figure 8:
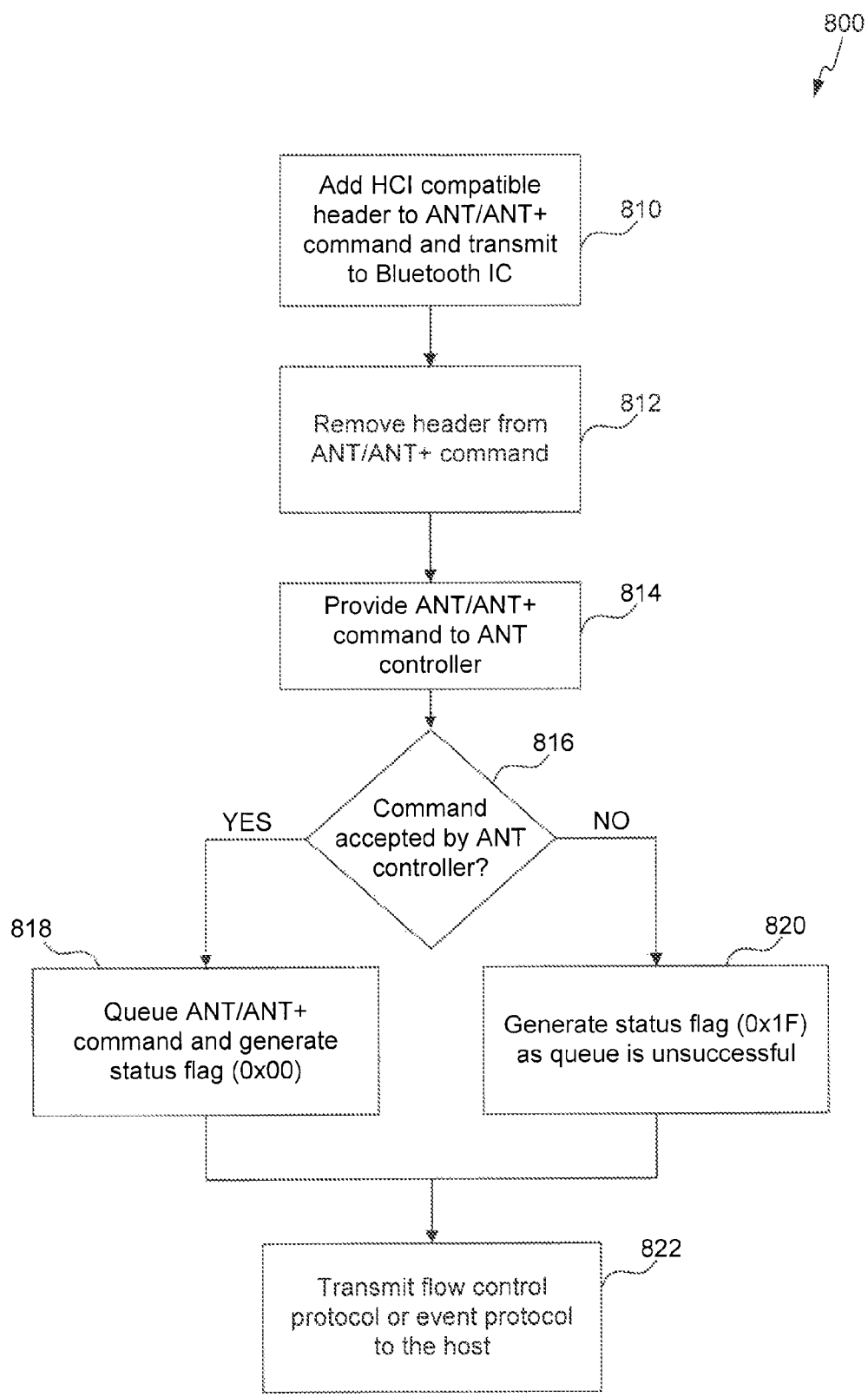
FIG. 8 illustrates a flowchart of an ANT command procedure according to an exemplary embodiment of the present disclosure.

FIG. 8 illustrates a flowchart 800 of a command processing method in accordance with an exemplary embodiment of the present disclosure. The method of flowchart 800 is described with continued reference to one or more of FIGS. 1-7. The steps of the method of flowchart 800 are not limited to the order described below, and the various steps may be performed in a different order. Further, two or more steps of the method of flowchart 800 may be performed simultaneously with each other.

The method of flowchart 800 begins at step 810, where the host 210 is configured to generate one or more ANT and/or ANT+ commands destined for one or more ANT and/or ANT+ enabled devices 130. In an exemplary embodiment, the BI 366 can be configured to add an HCI compatible header on to the ANT and/or ANT+ commands to generate one or more ANT HCI commands. In an exemplary embodiment, the BI 366 is configured to add an HCI compatible header on to the one or more ANT and/or ANT+ commands so that the ANT and/or ANT+ commands(s) conform to, for example, the command protocol 400 illustrated in FIG. 4.

The host 210 is configured to transmit the wrapped ANT and/or ANT+ command(s) to the Bluetooth IC 218 and the HCI 330 of the Bluetooth IC 218 is configured receive the ANT and/or ANT+ command(s) from the host 210.

After step 810, the method of flowchart 800 transitions to step 812, where Bluetooth IC is configured to process the one or more wrapped ANT and/or ANT+ commands received from the host 210. In an exemplary embodiment, the HCI 330 is configured to unwrap the ANT HCI command(s) by removing the header from the wrapped ANT and/or ANT+ command(s) (e.g., ANT HCI commands).

After step 812, the method of flowchart 800 transitions to step 814, where HCI 330 is configured to transmit the unwrapped ANT and/or ANT+ command(s) to the ANT controller 320 for further processing.

After step 814, the method of flowchart 800 transitions to step 816, where the ANT controller 320 is configured to receive the unwrapped ANT and/or ANT+ command(s) and to determine whether the unwrapped ANT and/or ANT+ command(s) can be queued for subsequent processing by the ANT controller 320.

If the ANT controller 320 determines that the unwrapped ANT and/or ANT+ command(s) can be queued for subsequent processing by the ANT controller 320 (YES at step 816), the method of flowchart 800 transitions to step 818.

If the ANT controller 320 determines that the unwrapped ANT and/or ANT+ command(s) cannot be queued for subsequent processing by the ANT controller 320 (NO at step 816), the method of flowchart 800 transitions to step 820.

At step 818, the ANT controller 320 is configured to queue the unwrapped ANT and/or ANT+ command(s) for subsequent processing and cause a flow control protocol to be generated that includes a status field having a value indicative of a successful queue for the flow control protocol (e.g., instructing the HCI 330 to set a status field for an event protocol received from the one or more ANT and/or ANT+ devices 130 with a value indicative of a successful queue). In an exemplary embodiment, the HCI 330 receives an indication of a successful queue, and is configured to generate an ANT and/or ANT+ event that conforms to the flow control protocol 500 illustrated in FIG. 5. In this example, the status field 520 of the flow control protocol 500 has a value of, for example, zero.

At step 820, the ANT controller 320 is unable to queue the wrapped ANT and/or ANT+ command(s) for subsequent processing, and therefore causes the HCI 330 to generate a flow control protocol that includes a status field having a value indicative of an unsuccessful queue (e.g., instructing the HCI 330 to set a status field for an event protocol received from the one or more ANT and/or ANT+ devices 130 with a value indicative of an unsuccessful queue). In an exemplary embodiment, the HCI 330 is configured to generate an ANT and/or ANT+ event that conforms to the flow control protocol 500 illustrated in FIG. 5. In this example, the status field 520 of the flow control protocol 500 has a value of, for example, 0x1F.

After steps 818 and 820, the method of flowchart 800 transitions to step 822, where the HCI 330 is configured to transmit the event protocol and/or a flow control protocol to the host 210 including a status filed having a value indicative of the ANT controller's 320 ability to queue the previous received ANT and/or ANT+ command received from the host 210.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

In embodiments having one or more components that include one or more processors, one or more of the processors can include (and/or be configured to access) one or more internal and/or external memories that store instructions and/or code that, when executed by the processor(s), cause the processor(s) to perform one or more functions and/or operations related to the operation of the corresponding component(s) as described herein and/or as would appreciated by those skilled in the relevant art(s).

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventors, and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A Bluetooth integrated circuit (IC), comprising:
a host controller interface (HCI) configured to:
 receive an ANT HCI command from a host; and
 remove a header from the ANT HCI command to generate an ANT command;
an ANT controller communicatively coupled to the HCI, and configured to:
 receive the ANT command from the HCI; and
 process the ANT command; and
a Bluetooth transceiver communicatively coupled to the ANT controller and configured to communicate the processed ANT command to a communication device.

2. The Bluetooth IC of claim 1, wherein the header comprises a flag field, an opcode field, a length field, and a padding field.

3. The Bluetooth IC of claim 2, wherein the opcode field comprises an Opcode Command Field (OCF) and an Opcode Group Field (OGF).

4. The Bluetooth IC of claim 3, wherein the HCI is configured to:
identify the ANT HCI command as a vendor-specific command based on the OCF;
identify the ANT HCI command as a command associated with an ANT protocol based on the OGF; and
forward the ANT command to the ANT controller.

5. The Bluetooth IC of claim 2, wherein the ANT HCI command comprises a payload that includes the ANT command.

6. The Bluetooth IC of claim 1, wherein the ANT controller is configured to:
attempt to queue the ANT HCI command in a queue;
generate an acknowledgement message that is indicative of whether the ANT HCI command was queued successfully; and
provide the acknowledgement message to the HCI.

7. The Bluetooth IC of claim 6, wherein the HCI is configured to:
receive the acknowledgement message from the ANT controller;
generate an ANT event based on the acknowledgement message, the ANT event including: a flag field, an event opcode field, a length field, a number of packets field, a command opcode field, and a status field.

8. The Bluetooth IC of claim 7, wherein the HCI is configured to generate the status field to be indicative of whether the ANT HCI command has been queued successfully.

9. The Bluetooth IC of claim 6, wherein the command opcode field comprises an Opcode Command Field (OCF) and an Opcode Group Field (OGF).

10. The Bluetooth IC of claim 1, further comprising a Bluetooth controller communicatively coupled to the HCI and the Bluetooth transceiver, and configured to control a Bluetooth device using the Bluetooth transceiver.

11. The Bluetooth IC of claim 1, wherein the Bluetooth transceiver is configured to receive an ANT event from the communication device, and wherein the HCI is configured to:
  wrap the ANT event with a second header to generate an ANT HCI event, and
  provide the ANT HCI event to the host.

12. A Bluetooth integrated circuit (IC), comprising:
  a Bluetooth transceiver configured to receive an ANT event from a communication device;
  an ANT controller communicatively coupled to the Bluetooth transceiver, and configured to:
    receive the ANT event from the Bluetooth transceiver; and
    process the ANT event; and
  a host controller interface (HCI) configured to:
    receive the processed ANT event from the ANT controller;
    wrap the processed ANT event with a header to generate an ANT HCI event; and
    transmit the ANT HCI event to a host.

13. The Bluetooth IC of claim 12, wherein the header comprises a flag field, an opcode field, a length field, a subcode field, and a status field.

14. The Bluetooth IC of claim 13, wherein the opcode field is configured to indicate that the ANT HCI event is a vendor-specific event, and wherein the subcode field is configured to indicate that the ANT HCI event is an event associated with an ANT protocol.

15. The Bluetooth IC of claim 12, wherein the ANT HCI event comprises a payload that includes the ANT event.

16. The Bluetooth IC of claim 12, wherein the ANT event is generated and provided by the communication device in response to an ANT HCI command previously generated by the host.

17. The Bluetooth IC of claim 12, wherein the HCI is configured to:
  receive an ANT HCI command from the host, the ANT HCI having a second header; and
  remove the second header from the ANT HCI command to generate an ANT command; and
  wherein the Bluetooth transceiver is configured to transmit the ANT command to the communication device.

18. A Bluetooth integrated circuit (IC), comprising:
  a Bluetooth transceiver configured to wirelessly communicate with a Bluetooth external device and an ANT external device;
  an ANT controller configured to control the ANT external device using the Bluetooth transceiver;
  a Bluetooth controller configured to control the Bluetooth external device using the Bluetooth transceiver;
  a host controller interface (HCI) configured to:
    receive commands from a host that is external to the Bluetooth IC;
    examine headers of the commands to distinguish an ANT command from a Bluetooth command; and
    forward the ANT command to the ANT controller and the Bluetooth command to the Bluetooth controller based on the headers.

19. The Bluetooth IC of claim 18, wherein:
  the ANT controller is configured to provide an acknowledgement message to the HCI indicating whether the ANT command has been queued for processing; and
  the HCI is configured to generate an HCI event having a status field that reflects whether the ANT command has been queued for processing by the ANT controller, and forward the HCI event to the host.

20. The Bluetooth IC of claim 18, wherein:
  the ANT controller is configured to generate an event in response to receiving data received by Bluetooth transceiver, the data originating from the ANT external device; and
  the HCI is configured to wrap the event with a header that identifies the event as an ANT related communication, and forward the wrapped event to the host.

* * * * *